(12) United States Patent
Kim (10) Patent No.: US 7,471,274 B2
(45) Date of Patent: Dec. 30, 2008

(54) LIQUID CRYSTAL DISPLAY DEVICE AND METHOD FOR DRIVING THE SAME

(75) Inventor: Kyong Seok Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 575 days.

(21) Appl. No.: 10/983,855

(22) Filed: Nov. 8, 2004

(65) Prior Publication Data

US 2005/0099378 A1   May 12, 2005

(30) Foreign Application Priority Data

Nov. 10, 2003   (KR) .................. 10-2003-0079134

(51) Int. Cl.
*G09G 3/36* (2006.01)
*G02F 1/1343* (2006.01)

(52) U.S. Cl. .................. 345/88; 349/144; 345/96

(58) Field of Classification Search .................. 345/87, 345/94, 96, 88; 349/56, 141, 39, 146, 144
See application file for complete search history.

(56) References Cited

U.S. PATENT DOCUMENTS

| 5,144,288 | A | * | 9/1992 | Hamada et al. | ............. 349/109 |
| 6,014,190 | A | * | 1/2000 | Kim et al. | ............. 349/39 |
| 6,538,713 | B1 | * | 3/2003 | Yanagawa et al. | ........... 349/146 |

2001/0011981 A1 * 8/2001 Yamamoto et al. ............ 345/87

FOREIGN PATENT DOCUMENTS

| JP | 2000-171775 | 6/2003 |
| KR | 2003-0048347 | 6/2003 |

OTHER PUBLICATIONS

Office Action dated Jul. 12, 2006 for corresponding Korean Patent Application No. 10-2003-0079134.

* cited by examiner

*Primary Examiner*—Amr Awad
*Assistant Examiner*—Stephen G Sherman
(74) *Attorney, Agent, or Firm*—Brinks Hofer Gilson & Lione (57) ABSTRACT

A liquid crystal display device has odd- and even-numbered rows of pixels sequentially and repeatedly arranged on a substrate in the horizontal direction, alternate rows being shifted horizontally, first and second groups of data lines for dividing the odd and even-numbered rows of pixels, respectively, into first sub-pixels and second sub-pixels and partitioning the even and odd-numbered rows of pixels, respectively. First and second groups of data lines are alternately arranged on the substrate in the vertical direction, for supplying data signals to the first and second sub-pixels, respectively, through switching devices disposed in each sub-pixel. Gate lines arranged on the first substrate in every two row of pixels in the horizontal direction, for supplying pulse-type scan signals to row units of the first sub-pixels and the second sub-pixels, and common voltage lines are arranged between the gate lines.

18 Claims, 10 Drawing Sheets

Odd Frame

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |

Even Frame

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |

LIQUID CRYSTAL DISPLAY DEVICE AND METHOD FOR DRIVING THE SAME

This application claims the benefit of Korean Patent Application 079134/2003, filed on Nov. 10, 2003, which is incorporated herein by reference.

TECHNICAL FIELD

The present application relates to a liquid crystal display device and a method for driving the same, and more particularly to a liquid crystal display device which may restrict reduction of quality of image and decrease power consumption, and a method for driving the same.

BACKGROUND

A liquid crystal display device includes a liquid crystal display panel for displaying an image, and a driving unit for driving the liquid crystal display panel.

The liquid crystal display panel consists of a thin film transistor array (TFT) substrate and a color filter (CF) substrate soldered to face each other with a predetermined cell-gap, and a liquid crystal layer formed in the cell-gap between the TFT substrate and the CF substrate.

A plurality of gate lines are arranged to be separated at regular intervals in the horizontal direction and a plurality of data lines are arranged to be separated at regular intervals in the vertical direction such that they cross each other on the TFT substrate. The TFT substrate is divided into a plurality of rectangular regions by intersecting gate lines and the data lines. The rectangular regions are respectively defined as pixels. Each of the pixels includes a switching device such as a thin film transistor and a pixel electrode.

Red (R), green (G) and blue (B) CFs are formed on the CF substrate corresponding to the pixels. A black matrix for preventing color interference of light passing through the CFs is formed in a mesh shape to cover the outer sides of the CFs. And, a common electrode for supplying an electric field to the liquid crystal layer with the pixel electrodes of the TFT substrate is formed on the CF substrate.

The liquid crystal is driven by a vertical electric field applied between pixel electrodes and common electrodes. In the case of a twisted nematic (TN) liquid crystal display device, the light transmission is symmetrically distributed over a wide range in the right/left viewing angle, but asymmetrically distributed with respect to an up/down viewing angle, narrowing the viewing angle. Consequently, light transmission in a gray scale display is changed according to the viewing angle. As a result, the fabrication of a large area liquid crystal display panel is difficult.

In order to resolve the narrow viewing angle of the TN liquid crystal display device, an in-plane-switching (IPS) liquid-crystal display device has been suggested in which the pixel electrodes and the common electrodes are formed on the same surface, and which drives liquid crystals by a horizontal electric field between the pixel electrodes and the common electrodes.

As compared with the TN liquid crystal display device, the IPS liquid crystal display device improves contrast ratio (C/R), gray inversion and color shift, and thus obtains a wide viewing angle. In the liquid crystal display device, R, G and B pixels are sequentially and repeatedly arranged in the horizontal direction, and arranged in a stripe shape in the vertical direction, for displaying image information.

Figure 1:
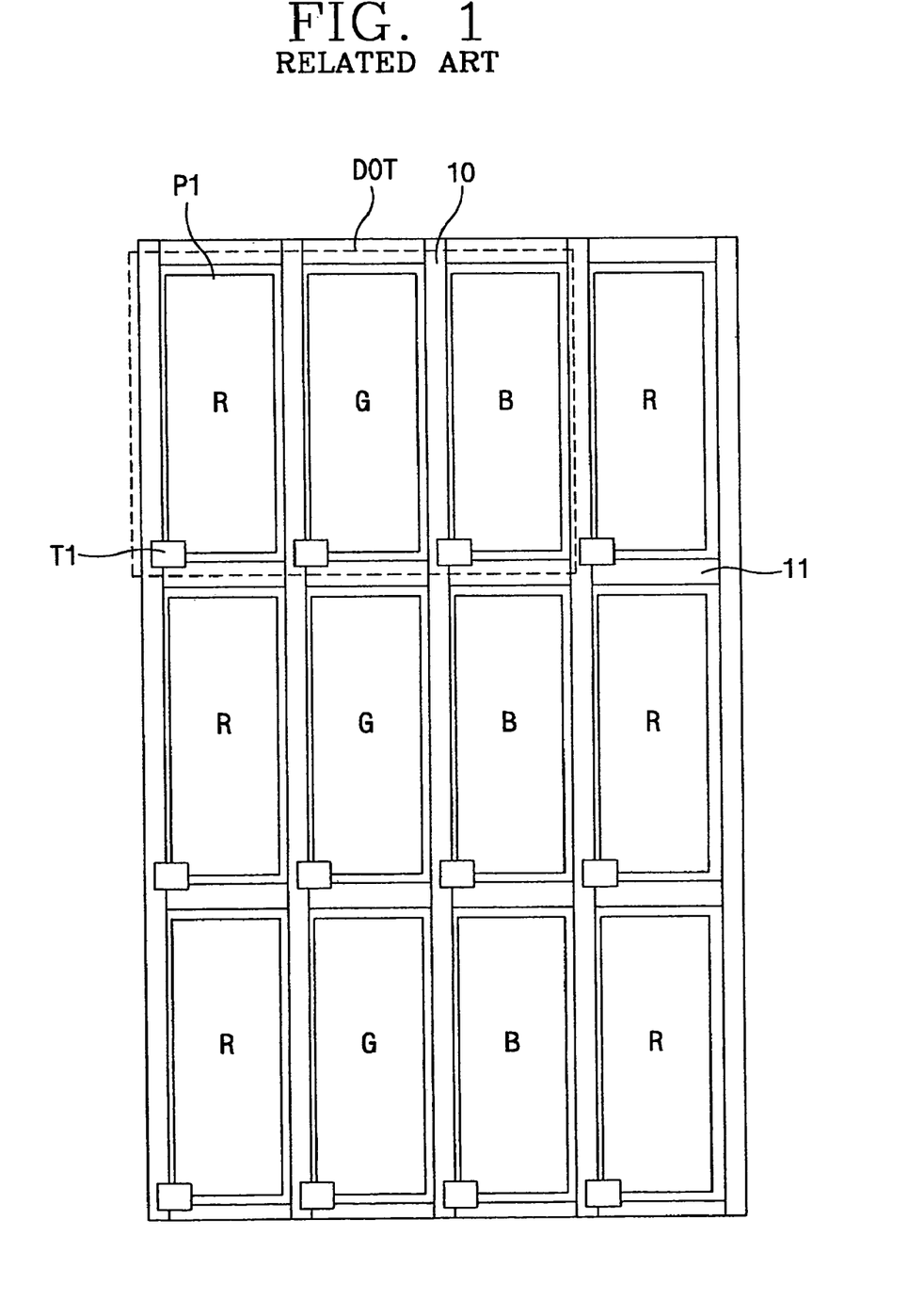
FIG. 1 is a plane view illustrating general pixel arrangement of a liquid crystal display device.

FIG. 1 is a plane view illustrating general pixel arrangement of a liquid crystal display device. A plurality of gate lines 11 arranged to be separated at regular intervals in the horizontal direction and a plurality of data lines 10 arranged to be separated at regular intervals in the vertical direction and cross each other on a substrate, thereby dividing the substrate into a plurality of rectangular regions defined as pixels. The pixels consist of red (R), green (G) and blue (B) color pixels. The R, G and B pixels P1 are sequentially and repeatedly arranged in the horizontal direction and arranged in a stripe shape in the vertical direction. In addition, switching devices T1 such as thin film transistors are individually disposed in the R, G and B pixels P1, and connected to the gate lines 11 and the data lines 10. The switching devices T1 are turned on by scan signals sequentially supplied to the gate lines 11. Image information supplied from the data lines 10 is transmitted to the R, G and B pixels P1 through the turned-on switching devices T1.

The liquid crystal display device represents one dot DOT of the image by combining light passing through the R, G and B pixels P1. One dot DOT consists of combinations of the R, G and B pixel P1.

As the liquid crystal display device having the aforementioned pixel arrangement displays the image through the rectangular DOT consisting of the R, G and B pixels P1, in the situation that a boundary of the image is formed in an oblique line or curved line, the oblique line or curved line is not smoothly displayed but displayed in a stair shape at the boundary of the image.

In order to resolve the above problems a triangular arrangement method for forming one DOT by R, G and B pixels P1 arranged in a triangular shape has been suggested.

Figure 2A:
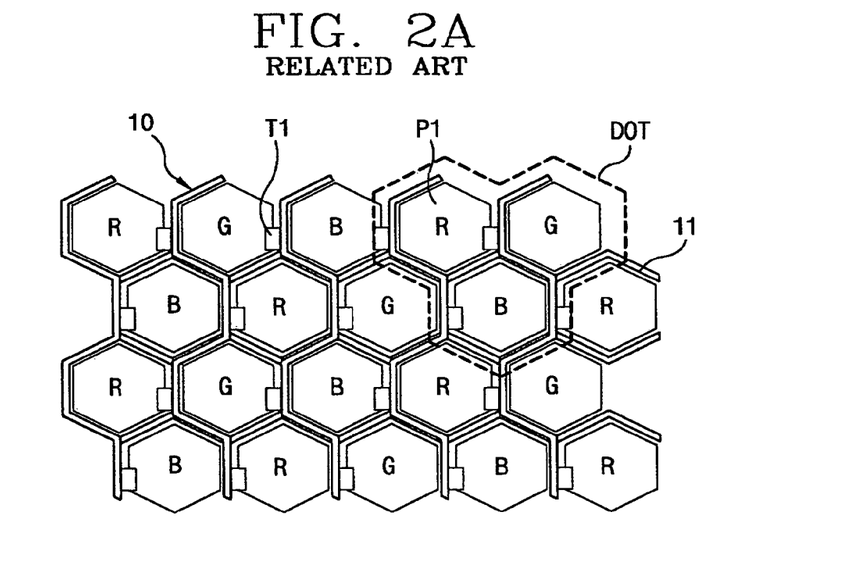
FIG. 2A is a plane view illustrating triangular arrangement of the pixels of a liquid crystal display device.

FIG. 2A is a plane view illustrating triangular arrangement of the pixels of a liquid crystal display device. A plurality of gate lines 11 arranged parallel to each other in a zigzag shape in the horizontal direction and a plurality of data lines 10 arranged parallel to each other in a zigzag shape in the vertical direction cross each other, and R, G and B pixels P1 are arranged in a honeycomb shape in hexagonal regions formed by the gate lines 11 and the data lines 10. In addition, switching devices T1 are individually disposed in the R, G and B pixels P1. When scan signals are sequentially supplied to the gate lines 11, the switching devices transmit image information supplied through the data lines 10 to the R, G and B pixels P1.

The triangular arrangement of the pixels of liquid crystal display device for arranging the R, G and B pixels P1 in a honeycomb shape displays an image through a triangular dot DOT consisting of the R, G and B pixels P1. In the case that the boundary of the image is formed in an oblique line or curved line shape, the oblique line or curved line can be smoothly displayed in the boundary of the image. Such pixel arrangement is called a delta arrangement.

However, in the triangular arrangement liquid crystal display device for arranging the R, G and B pixels P1 in a honeycomb shape, the data lines 10 and the gate lines 11 are arranged in a zigzag shape, and thus have a larger line length than those in straight arrangement of the lines. Accordingly, image information or scan signals transmitted through the data lines 10 and the gate lines 11 may be distorted and delayed, which results in driving failure or a lower quality of image in the liquid crystal display device.

Figure 2B:
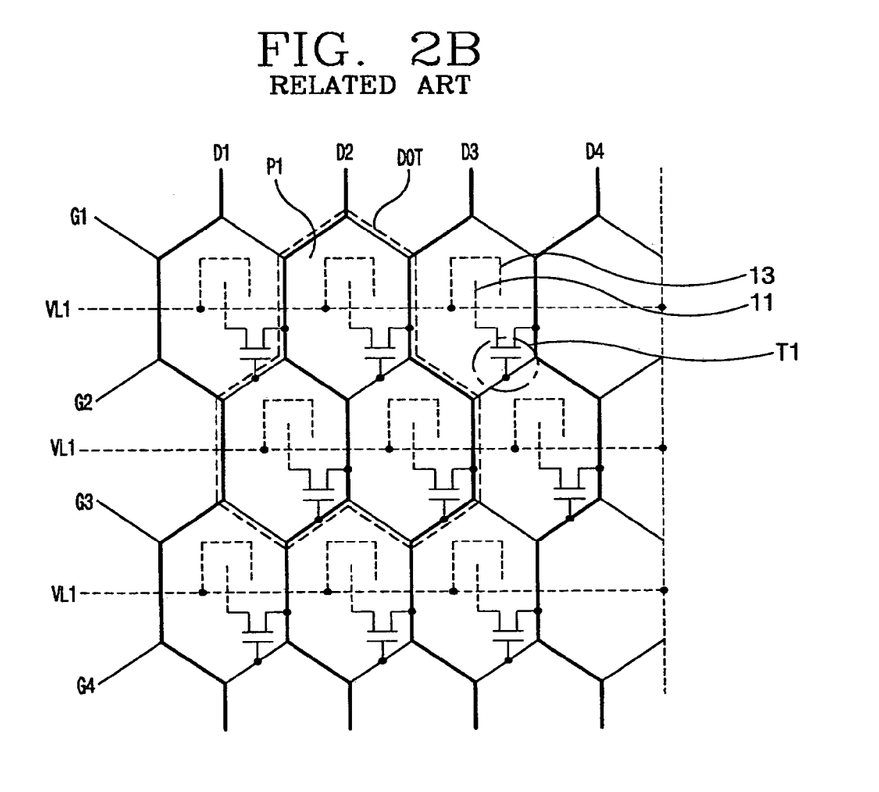
FIG. 2B is a circuit view illustrating an equivalent circuit of the triangularly-arranged pixels of FIG. 2A.

FIG. 2B is a circuit view illustrating an equivalent circuit of the triangularly-arranged pixels of FIG. 2a in the liquid crystal display device. A plurality of gate lines G1 to G4 are arranged in parallel in a zigzag shape in the horizontal direction, and a plurality of data lines D1 to D4 are arranged in parallel in a zigzag shape in the vertical direction. The gate lines G1 to G4 and the data lines D1 to D4 cross each other.

Hexagonal pixels P1 are arranged in a triangular shape to compose one DOT. Switching devices T1 for supplying image information to pixel electrodes 11 are disposed in the pixels P1.

Generally, thin film transistors are used as the switching devices T1. Gate electrodes of the thin film transistors are connected to the gate lines G1 to G4, source electrodes thereof are connected to the data lines D1 to D4, and drain electrodes thereof are connected to the pixel electrodes 11 of the pixels P1, respectively. Accordingly, when scan signals of the liquid crystal display device are sequentially supplied to the gate lines G1 to G4, the thin film transistors are turned on in a unit of gate line G1 to G4, and thus conductive channels are formed between the source electrodes and the drain electrodes. The image information supplied to the source electrodes of the thin film transistors through the data lines D1 to D4 is transmitted to the drain electrodes through the conductive channels. Here, the drain electrodes are connected to the pixel electrodes 11, and thus the image information is supplied to the pixel electrodes 11.

Common electrodes 13 are formed in the pixels P1 at regular intervals and disposed such that they are separated from the pixel electrodes. Common voltages are supplied to the common electrodes 13 of the pixels P1 through common voltage lines VL1. Because the common voltage lines VL1 are arranged in parallel to the gate lines G1 to G4 and electrically connected to each other, the same common voltages are supplied to all of the pixels P1. Therefore, a liquid crystal layer is driven by a horizontal electric field between the image information supplied to the pixel electrodes 11 and the common voltages supplied to the common electrodes 13.

Although not illustrated, the pixel electrodes 11 are electrically connected to storage capacitors disposed in each pixel. During the turn-on period of the thin film transistors in which the scan signals are supplied, the image information supplied to the pixel electrode 11 is charged in the storage capacitors. During the turn-off period of the thin film transistors in which the scan signals are not supplied, the charge representing image information is supplied to the pixel electrodes 11, to maintain the driving of the liquid crystal layer.

When a constant electric field is continuously supplied to the liquid crystal layer, liquid crystals deteriorate, and after images are formed when direct current voltage is used. In order to prevent deterioration of the liquid crystals, the voltages representing the image information are supplied to have alternating positive and negative polarities with respect to the common voltages. This driving method is called an inversion driving method.

Exemplary inversion driving methods include a frame inversion method for inverting polarity of image information on a frame-by-frame basis, a line inversion method for inverting polarity of image information in a line-by-line basis, and a dot inversion method for inverting polarity of image information both in each adjacent pixel and from frame-to-frame.

In the aforementioned inversion driving methods, the dot inversion method provides high image quality by restricting image distortion such as flicker or crosstalk in comparison with the other inversion methods. The dot inversion method will now be described in more detail with reference to the accompanying drawings.

Figure 3:
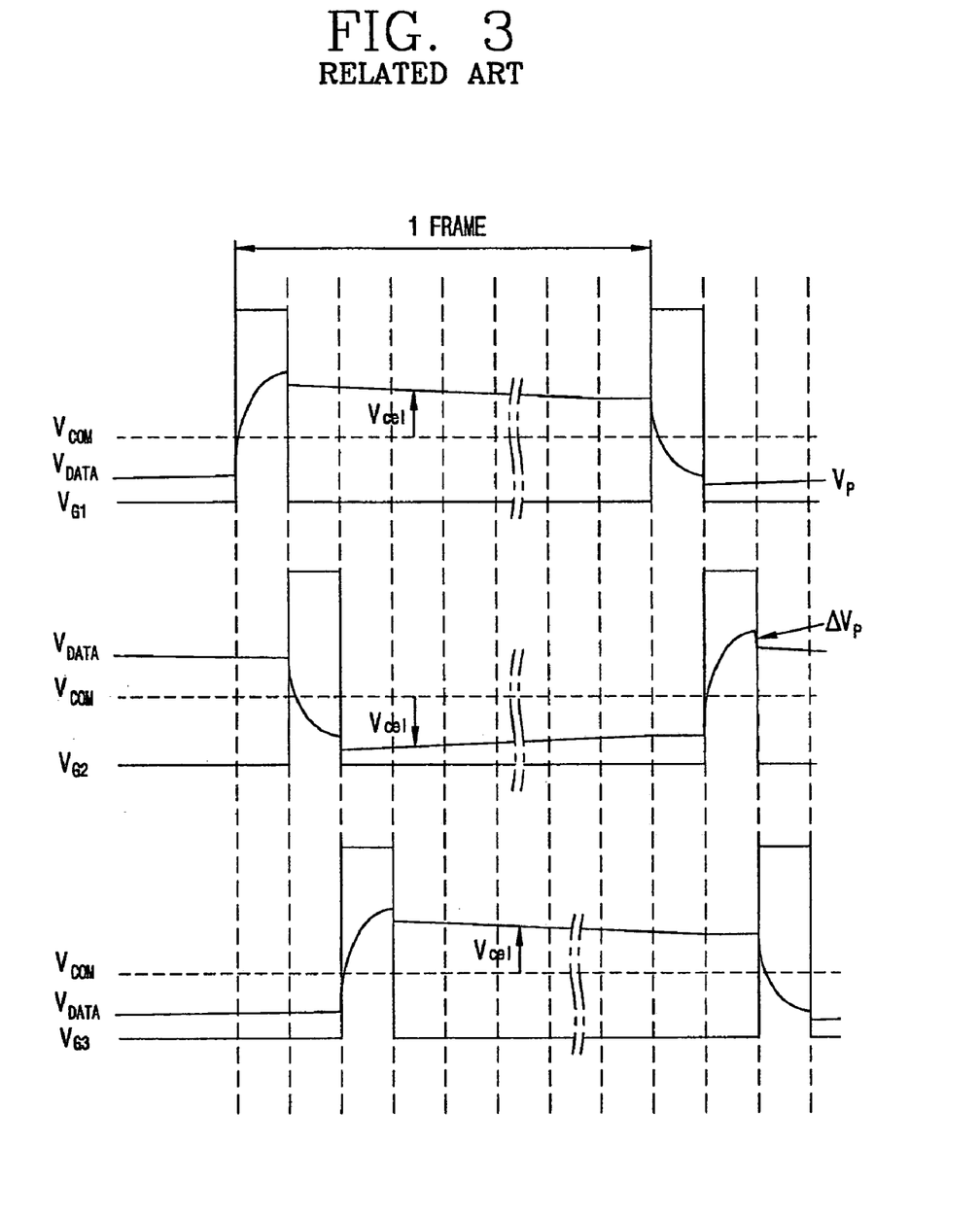
FIG. 3 is an exemplary view illustrating voltage waveforms of pixels in a dot inversion driving method.

FIG. 3 is an exemplary view illustrating voltage waveforms of pixels in the dot inversion driving method. Common voltages $V_{COM}$ that are constant direct current voltages are supplied to common electrodes, and scan signals $V_{G1}$ to $V_{G3}$ are sequentially supplied to gate lines. Positive and negative polarities of image information $V_{DATA}$ are inverted in each adjacent pixel on the basis of the common voltages $V_{COM}$. In addition, the positive and negative polarities of the image information $V_{DATA}$ are inverted from frame-to-frame with respect to the common voltages $V_{COM}$.

During the turn-on period of thin film transistors in which the scan signals $V_{G1}$ to $V_{G3}$ are supplied with a high potential, the image information $V_{DATA}$ supplied to pixel electrodes is charged in storage capacitors with pixel voltage waveforms Vp. During the turn-off period of the thin film transistors in which the scan signals $V_{G1}$ to $V_{G3}$ are supplied with a low potential, the pixel voltages Vp which were charged in the storage capacitors are supplied to the pixel electrodes, to maintain the driving of the liquid crystals.

When the scan signals $V_{G1}$ to $V_{G3}$ transition to a low potential, the pixel voltages Vp are lowered due to parasitic capacitance coupling generated by overlapped gate electrodes and drain electrodes of the thin film transistors, which is represented as a fluctuation range $\Delta Vp$ of the pixel voltages Vp.

Liquid crystal driving voltages Vcel for driving the liquid crystal layer are defined as voltages ($V_{DATA}$-$V_{COM}$) obtained by subtracting the common voltages $V_{COM}$ supplied to the common electrodes from the image information $V_{DATA}$ supplied to the pixel electrodes. Because the liquid crystals are driven by an electric field generated by the liquid crystal driving voltage Vcel, the conventional liquid crystal display device requires a high voltage level of the image information $V_{DATA}$ to display a target image, which results in high power consumption.

The common voltages are supplied to the common electrodes of the pixels and constantly maintained for one frame, and the image information is supplied to the adjacent data lines according to the dot inversion method for supplying different polarities of image information. The liquid crystals are driven by voltage differences between the image information and the common voltages.

Figure 4:
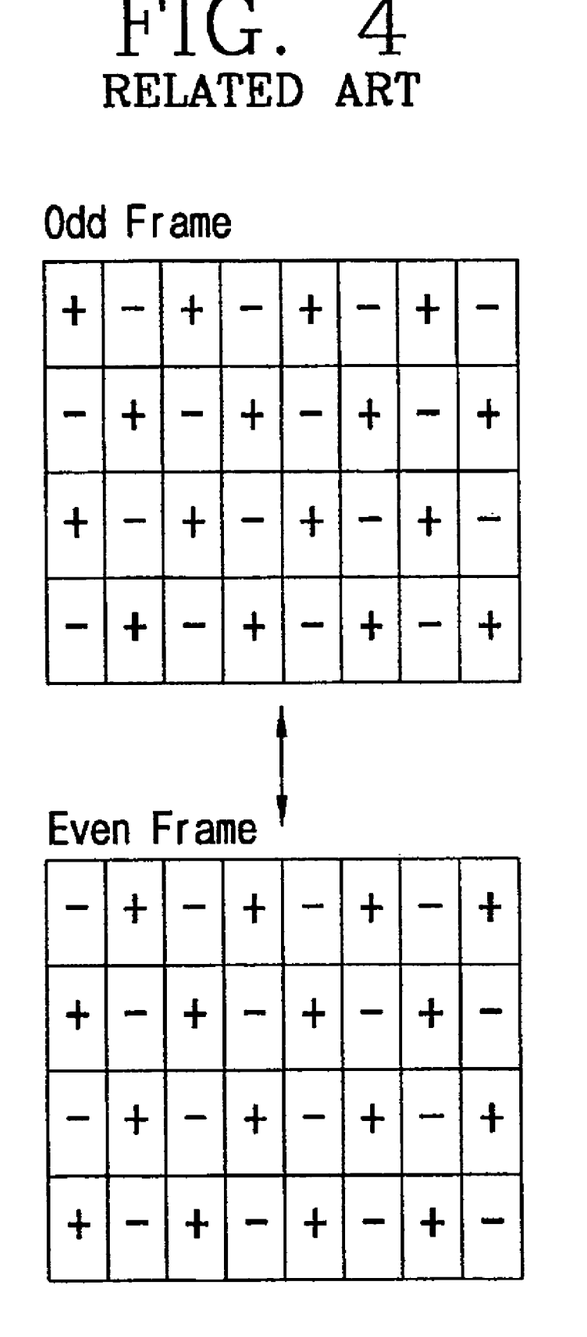
FIG. 4 is an exemplary view illustrating a polarity arrangement in the dot inversion driving method.

FIG. 4 is an exemplary view illustrating polarity constitution of the pixels in the dot inversion driving method. Different polarities of image information are supplied to the adjacent pixels in accordance with to the dot inversion method, and different polarities of image information are supplied to the pixels in sequential frames.

In the conventional triangular arrangement liquid crystal display device, the data lines and the gate lines are arranged in a zigzag shape, and thus have an extended line length. Accordingly, the image information or scan signals transmitted through the data lines and the gate lines are distorted or delayed, which results in driving failure or a lower quality image of the liquid crystal display device. Furthermore, as the liquid crystal display device is driven by the inversion driving method, the liquid crystal driving voltages for driving the liquid crystals are defined as the voltages obtained by subtracting the common voltages from the image information. In order to display a target image, a high voltage level of the image information is required, and thus power consumption of the liquid crystal display device is increased.

SUMMARY

A liquid crystal display device is described, including: odd-numbered rows of R, G and B pixels sequentially repeatedly arranged on a substrate in the horizontal direction; even-numbered rows of R, G and B pixels sequentially repeatedly arranged on the substrate to be shifted with respect to the odd-numbered rows of pixels; dots formed by delta-arranging three R, G and B pixels of the odd-numbered rows and the even-numbered rows; a first group of data lines for dividing the odd-numbered rows of pixels into first sub-pixels and partitioning the even-numbered rows of pixels, and a second group of data lines for dividing the even-numbered rows of pixels into second sub-pixels and partitioning the odd-numbered rows of pixels, the first and second groups of data lines being alternately arranged on the substrate in the vertical direction; first electrodes and second electrodes individually disposed in the first sub-pixels and the second sub-pixels, for forming a horizontal electric field; switching devices individually disposed in the first sub-pixels and the second sub-pixels; gate lines arranged on the substrate in every two row of the pixels in the horizontal direction, for supplying pulse type scan signals sequentially shifted in row units of the first sub-pixels and the second sub-pixels; and common voltage lines arranged between the gate lines, for supplying pulse type common voltages synchronized with rising edges of the scan signals for maintaining a high or low potential for one frame to the second electrodes disposed in the row units of first sub-pixels and the second sub-pixels.

In addition, a driving method of a liquid crystal display device includes the steps of: electrically connecting switching devices disposed in odd-numbered rows of pixels and even-numbered rows of pixels, by supplying pulse-type scan signals sequentially shifted with gate lines arranged on a substrate in every two row of the pixels in the horizontal direction; supplying pulse-type common voltages sequentially synchronized with rising edges of the scan signals for maintaining a high or low potential for one frame to pixel electrodes disposed in the odd-numbered rows of pixels and the even-numbered rows of pixels through common voltage lines arranged between the gate lines; and driving dots in row units, by supplying image information to the pixel electrodes disposed in the odd-numbered rows of pixels and the even-numbered rows of pixels through the electrically-connected switching devices, by supplying the image information to a first group of data lines and a second group of data lines alternately arranged on the substrate in the vertical direction.

DETAILED DESCRIPTION

Exemplary embodiments of the invention may be better understood with reference to the drawings, but these embodiments are not intended to be of a limiting nature. Rather, the invention is to cover all modifications, equivalents, and alternatives falling within the spirit and scope of the invention which is set forth by the claims. Like numbered elements in the same or different drawings perform equivalent functions.

A liquid crystal display device includes odd-numbered rows of R, G and B pixels arranged sequentially and repeatedly on a substrate in the horizontal direction; even-numbered rows of R, G and B pixels arranged sequentially and repeatedly on the substrate and shifted horizontally with respect to the odd-numbered rows of pixels; dots formed by delta-arranging three R, G and B pixels of the odd-numbered rows and the even-numbered rows; a first group of data lines for dividing the odd-numbered rows of pixels into first sub-pixels and partitioning the even-numbered rows of pixels, and a second group of data lines for dividing the even-numbered rows of pixels into second sub-pixels and partitioning the odd-numbered rows of pixels, the first and second groups of data lines being alternately arranged on the substrate in the vertical direction; first electrodes and second electrodes individually disposed in the first sub-pixels and the second sub-pixels, for forming a horizontal electric field; switching devices individually disposed in the first sub-pixels and the second sub-pixels; gate, lines arranged on the substrate in every two row of the pixels in the horizontal direction, for supplying scan signals of pulse form sequentially shifted in every two row of the first sub-pixels and the second sub-pixels; and common voltage lines arranged between the gate lines, for supplying common voltages of pulse form synchronized with rising edges of the scan signals for maintaining a high or low potential for one frame to the second electrodes disposed in the row units of first sub-pixels and the second sub-pixels.

In addition, a driving method of the liquid crystal display device includes turning-on switching devices disposed in the odd-numbered rows of pixels and the even-numbered rows of pixels, by supplying scan signals of pulse form sequentially to gate lines arranged on the substrate in every two row of the pixels in the horizontal direction; supplying common voltages of pulse form sequentially synchronized with rising edges of the scan signals for maintaining a high or low potential for one frame to pixel electrodes disposed in the odd-numbered rows of pixels and the even-numbered rows of pixels through common voltage lines arranged between the gate lines; and driving the dots in a unit of row, by supplying image information to the pixel electrodes disposed in the odd-numbered rows of pixels and the even-numbered rows of pixels through the turned-on switching devices, and by supplying the image information to a first group of data lines and a second group of data lines alternately arranged on the substrate in the vertical direction.

Figure 5:
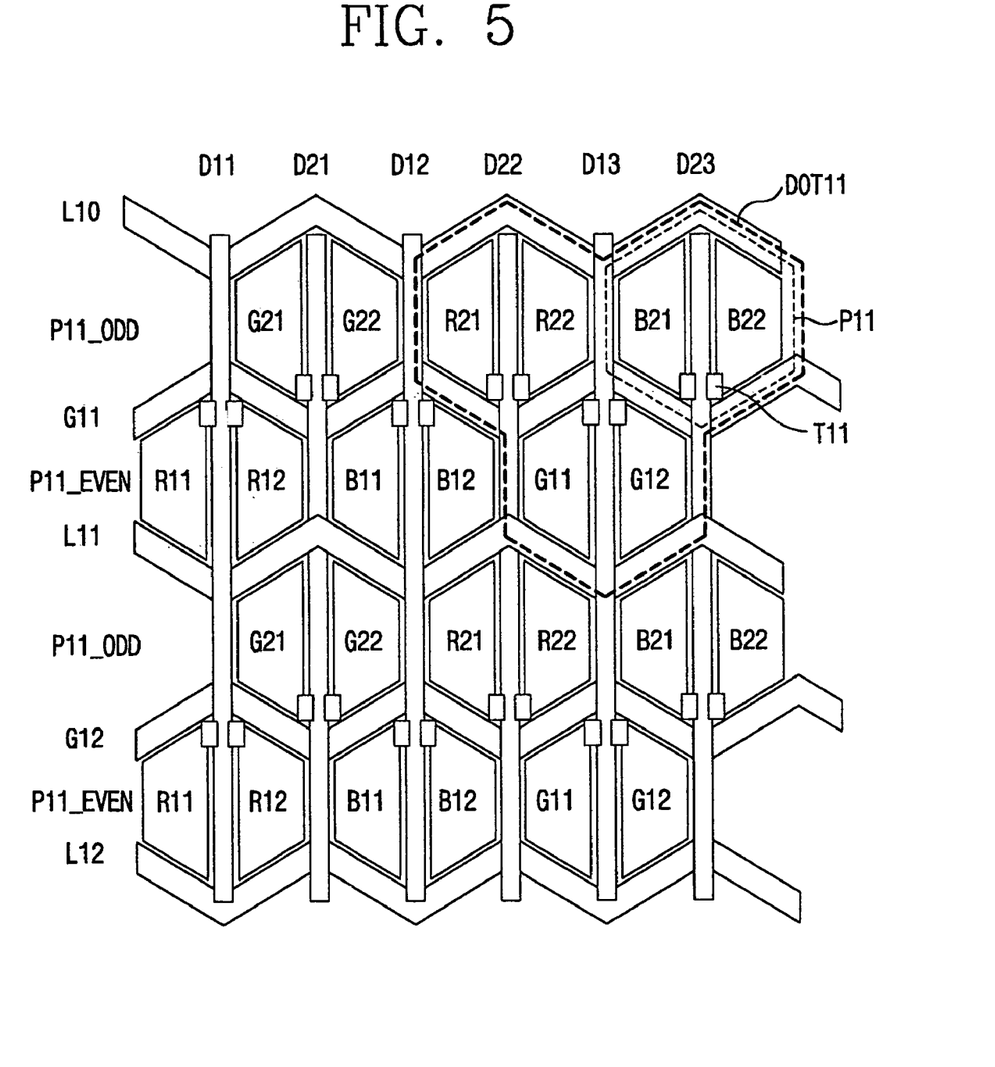
FIG. 5 is an exemplary view illustrating triangular arrangement of pixels of a liquid crystal display device in accordance with a first embodiment.

FIG. 5 is a view illustrating a triangular arrangement of pixels of a liquid crystal display device. A plurality of R, G and B pixels P11 are arranged on a substrate in a honeycomb shape, only a portion of which is shown. Three pixels P11, being R, G and B may be arranged in a triangular shape, to compose a dot DOT11 which may be a color display unit of an image. Such triangular arrangement is called a delta arrangement.

A first group of data lines D11, D12 and D13 for dividing even-numbered rows of pixels P11_EVEN into first sub-pixels R11, R12, G11, G12, B11 and B12 and partitioning odd-numbered rows of pixels P11_ODD, and a second group of data lines D21, D22 and D23 for dividing the odd-numbered rows of pixels P11_ODD into second sub-pixels R21, R22, G21, G22, B21 and B22 and partitioning the even-numbered rows of pixels P11_EVEN, are alternately arranged parallel to each other on the substrate in a substantially straight line shape in the vertical direction.

Gate lines G11 and G12 are arranged in every two row of the pixels P11 in the horizontal direction and having a zigzag shape. Common voltage lines VL10, VL11 and VL12 are arranged in the pixel rows respectively between the gate lines G11 and G12 in the horizontal direction and having a zigzag shape. The R, G and B pixels P11 are arranged in a honeycomb shape in hexagonal regions partitioned by the gate lines G11 and G12 and the common voltage lines VL10, VL11 and VL12 arranged in a zigzag shape in the horizontal direction, and the first group of data lines D11, D12 and D13 and the second group of data lines D21, D22 and D23 arranged in a straight line shape in the vertical direction. The numbering of the various lines is intended to facilitate the description of the relationship of elements in the drawings and should be understood as representing a group of such lines selected from the plurality of such groups.

First electrodes (pixel electrodes) and second electrodes (common electrodes) are individually disposed in the first sub-pixels R11, R12, G11, G12, B11 and B12 and the second sub-pixels R21, R22, G21, G22, B21 and B22 divided by the first group of data lines D11, D12 and D13 and the second group of data lines D21, D22 and D23, thereby generating a horizontal electric field.

Switching devices T11 such as thin film transistors are individually disposed in regions partitioned by the gate lines G11 and G12, and the first group of data lines D11, D12 and D13 and the second group of data lines D21, D22 and D23 arranged in the vertical direction, thereby allowing image information to be supplied to the first sub-pixels R11, R12, G11, G12, B11 and B12 and the second sub-pixels R21, R22, G21, G22, B21 and B22 through the first group of data lines D11, D12 and D13 and the second group of data lines D21, D22 and D23, respectively. The thin film transistors have gate electrodes connected respectively to the gate lines G11 and G12, source electrodes connected respectively to the first group of data lines D11, D12 and D13 and the second group of data lines D21, D22 and D23, and drain electrodes connected respectively to the pixel electrodes of the first sub-pixels R11, R12, G11, G12, B11 and B12 and the second sub-pixels R21, R22, G21, G22, B21 and B22. The details of this connection are not shown.

The switching devices T11 are symmetrically formed at both sides of the first group of data lines D11, D12 and D13 and the second group of data lines D21, D22 and D23. The pair of switching devices T11 symmetrically formed respectively at both sides of the first group of data lines D11, D12 and D13 and the second group of data lines D21, D22 and D23 are alternately connected to first electrodes of the first sub-pixels R11, R12, G11, G12, B11 and B12 of the rows of the gate lines G11 and G12 and the second sub-pixels R21, R22, G21, G22, B21 and B22 of the rows of the gate lines G11 and G12, respectively.

Inverted pulse-type common voltages are supplied during a horizontal period to the second electrodes of the first sub-pixels R11, R12, G11, G12, B11 and B12 and the second sub-pixels R21, R22, G21, G22, B21 and B22 by the common voltage lines VL10, VL11 and VL12. The common voltages are synchronized with rising edges of scan signals, and sequentially supplied to the common voltage lines VL10, VL11 and VL12 and having either a high or low potential, and the common voltages are maintained for one frame period.

In the liquid crystal display device having pixels arranged in a triangular shape, the first group of data lines D11, D12 and D13 and the second group of data lines D21, D22 and D23 are arranged in straight line shapes, and thus have a smaller line length than data lines arranged in a zigzag shape in the conventional triangular arrangement of liquid crystal display device. Therefore, the liquid crystal display device may minimize distortion and delay of the image information transmitted through the first group of data lines D11, D12 and D13 and the second group of data lines D21, D22 and D23. Moreover, the switching devices T11 are disposed at both sides of the first group of data lines D11, D12 and D13 and the second group of data lines D21, D22 and D23. Accordingly, charging characteristics of the image information supplied to the pixels P11 may be improved, and fabrication process deviations of the thin film transistors used as the switching devices T11 may be compensated for. As a result, the whole pixels P11 may be provided with uniform electrical properties.

The first group of data lines D11, D12 and D13 and the second group of data lines D21, D22 and D23 are formed in a straight line shape, maintaining the triangular arrangement of the pixels P11. Thus, a curved line or oblique line of an image may be smoothly displayed.

Although the first group of data lines D11, D12 and D13 and the second group of data lines D21, D22 and D23 are arranged in a straight line shape, the common voltage lines VL10, VL11 and VL12 and the gate lines G11 and G12 are arranged in a zigzag shape, which increases their line length. A voltage drop may be caused in the common voltages and the scan signals, and thus the magnitude of an electric field supplied to a liquid crystal layer may be changed.

Figure 6:
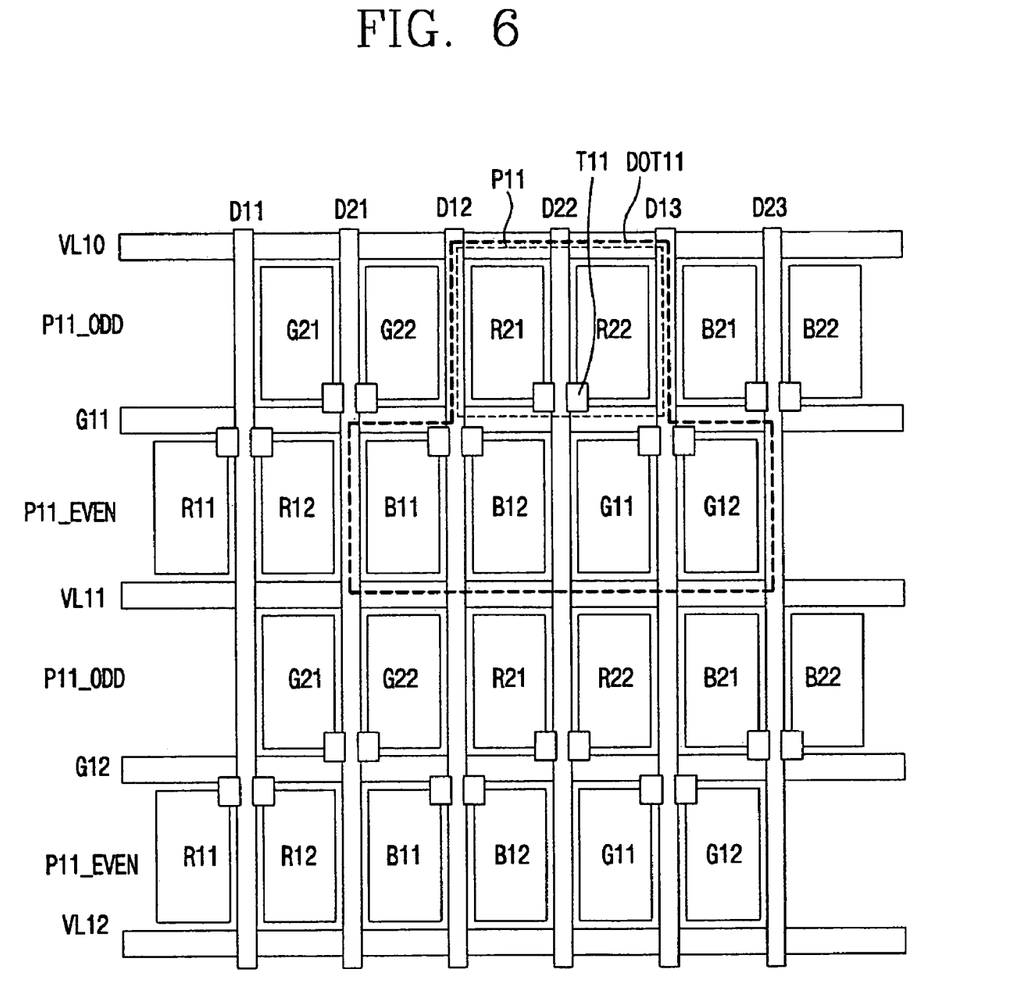
FIG. 6 is an exemplary view illustrating a triangular arrangement of pixels of a liquid crystal display device in accordance with a second embodiment.

In a second embodiment, shown in FIG. 6, odd-numbered rows of R, G and B pixels P11_ODD are sequentially and repeatedly arranged on a substrate in the horizontal direction, and even-numbered rows of R, G and B pixels P11_EVEN are sequentially and repeatedly arranged in the horizontal direction disposed so as to be shifted from the R, G and B pixels P11_ODD in the horizontal direction. Three R, G and B pixels P11 may be arranged in a triangular shape, to compose a dot DOT11 which may be a color display unit of an image.

A first group of data lines D11, D12 and D13 for dividing the even-numbered rows of pixels P11_EVEN into first sub-pixels R11, R12, G11, G12, B11 and B12 and partitioning the odd-numbered rows of pixels P11_ODD, and a second group of data lines D21, D22 and D23 for dividing the odd-numbered rows of pixels P11_ODD into second sub-pixels R21, R22, G21, G22, B21 and B22 and partitioning the even-numbered rows of pixels P11_EVEN are alternately disposed in the vertical direction in a straight line shape.

Gate lines G11 and G12 are arranged in every two row of the pixels P11 in the horizontal direction in straight line shape. Common voltage lines VL10, VL11 and VL12 are arranged between the gate lines G11 and G12 in the horizontal direction in a straight line shape.

The odd-numbered rows of R, G and B pixels P11_ODD are sequentially and repetitively arranged in the horizontal direction, and the even-numbered rows of R, G and B pixels P11_EVEN are sequentially and repetitively arranged to be shifted from the odd-numbered rows of pixels P11_ODD in the horizontal direction in rectangular regions formed by the intersections of gate lines G11 and G12 and the common voltage lines VL10, VL11 and VL12 arranged in the horizontal direction, and the first group of data lines D11, D12 and D13 and the second group of data lines D21, D22 and D23 arranged in the vertical direction. In the first embodiment of FIG. 5, the pixels P11 are arranged in a hexagonal shape, but in the second embodiment of FIG. 6, the pixels P11 are arranged in a rectangular shape.

First electrodes (pixel electrodes) and second electrodes (common electrodes), are individually disposed in the first sub-pixels R11, R12, G11, G12, B11 and B12 and the second sub-pixels R21, R22, G21, G22, B21 and B22 divided by the first group of data lines D11, D12 and D13 and the second group of data lines D21, D22 and D23, for generating a horizontal electric field.

Switching devices T11 are individually disposed in regions formed by the gate lines G11 and G12, and the first group of data lines D11, D12 and D13 and the second group of data lines D21, D22 and D23, thereby allowing image information supplied to the first sub-pixels R11, R12, G11, G12, B11 and B12 and the second sub-pixels R21, R22, G21, G22, B21 and B22 through the first group of data lines D11, D12 and D13 and the second group of data lines D21, D22 and D23, respectively. The thin film transistors have their gate electrodes connected respectively to the gate lines G11 and G12, their source electrodes connected respectively to the first group of data lines D11, D12 and D13 and the second group of data lines D21, D22 and D23, and their drain electrodes connected respectively to first electrodes of the first sub-pixels R11, R12, G11, G12, B11 and B12 and the second sub-pixels R21, R22, G21, G22, B21 and B22, respectively.

The switching devices T11 are symmetrically formed at both sides of the first group of data lines D11, D12 and D13 and the second group of data lines D21, D22 and D23, and alternately connected to first electrodes of the first sub-pixels R11, R12, G11, G12, B11 and B12 and the gate lines G11 and G12 and the second sub-pixels R21, R22, G21, G22, B21 and B22 and the gate lines G11 and G12.

Inverted pulse-type common voltages are supplied in a horizontal period to second electrodes of the first sub-pixels R11, R12, G11, G12, B11 and B12 and the second sub-pixels R21, R22, G21, G22, B21 and B22 of the common voltage lines VL10, VL11 and VL12. The common voltages are synchronized with rising edges of scan signals, are sequentially supplied to the common voltage lines VL10, VL11 and VL12 either a high or low potential, and maintained for one frame.

The second embodiment has pixels arranged in a triangular shape. The first group of data lines D11, D12 and D13 and the second group of data lines D21, D22 and D23 are arranged in a straight line shape in the vertical direction, and thus have a smaller line length than the data lines arranged in a zigzag shape in the vertical direction in the conventional triangular arrangement liquid crystal display device. That is, the liquid crystal display device may have decreased distortion and delay of the image information transmitted through the first group of data lines D11, D12 and D13 and the second group of data lines D21, D22 and D23.

The switching devices T11 are disposed at both sides of the first group of data lines D11, D12 and D13 for dividing the even-numbered rows of pixels P11_EVEN into the first sub-pixels R11, R12, G11, G12, B11 and B12, and the second group of data lines D21, D22 and D23 for dividing the odd-numbered rows of pixels P11_ODD into the second sub-pixels R21, R22, G21, G22, B21 and B22. Charging characteristics of the image information supplied to the pixels P11 may be improved, and the deviation of fabrication process of the thin film transistors may be compensated for In accordance with the second embodiment, the gate lines G11 and G12 and the common voltage lines VL10, VL11 and VL12 are arranged in a straight line in the horizontal direction, and thus have a smaller line length than the gate lines G11 and G12 and the common voltage lines VL10, VL11 and VL12 arranged in a zigzag shape in the horizontal direction in the first embodiment. The liquid crystal display device may have decreased distortion and delay of the scan signals and the common voltages.

The liquid crystal display device increases the voltage difference between the common voltage and the image information by supplying the pulse type common voltage in every frame. That is, the liquid crystal display device uses an inverting common voltage supply method for forming the same magnitude voltage difference as that of the conventional device although supplying image information having a smaller voltage. Even though the liquid crystal display device uses a low output voltage, it can supply a high voltage magnitude to the liquid crystals by the combination of image information voltage with the common voltage.

Figure 7:
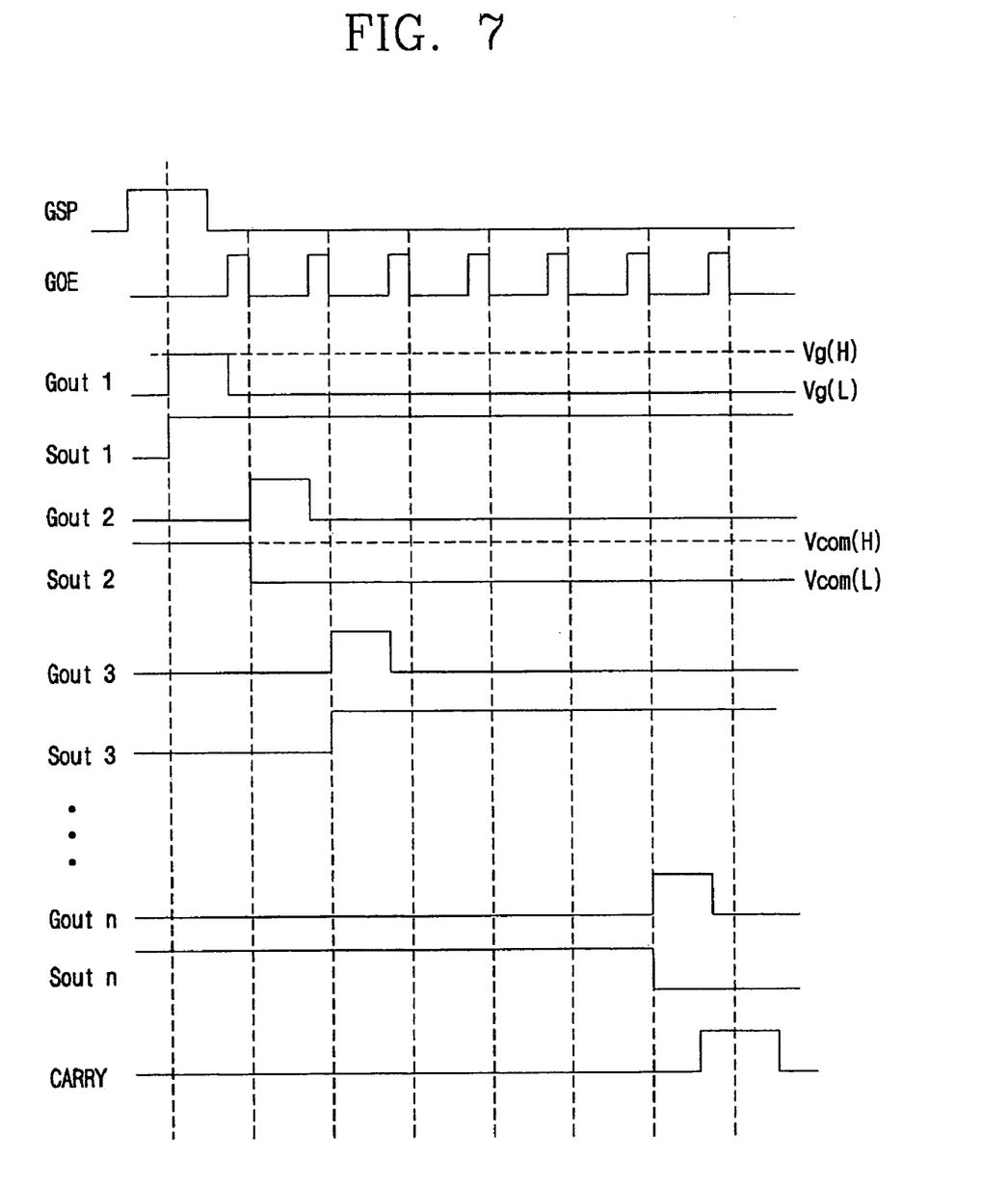
FIG. 7 is a waveform view illustrating waveforms of signals from a gate driving unit.

FIG. 7 is a waveform view illustrating waveforms of signals from a gate driving unit. The liquid crystal display device may be divided into a liquid crystal display panel, and a driving unit for driving the liquid crystal display panel. The driving unit may be divided into a gate driving unit and a data driving unit. The gate driving unit sequentially supplies scan signals to the gate lines, and the data driving unit supplies image information to the data lines.

When a gate start pulse GSP is supplied to the gate driving unit, signals are outputted from the gate driving unit. Scan signals Gout 1 to Gout n are sequentially supplied to corresponding gate lines. The scan signals Gout 1 to Gout n have a high potential during a low potential period of a gate output enable signal GOE. When the gate output enable signal GOE has a high potential, the scan signals Gout 1 to Gout n are inverted to a low potential. Here, common voltages Sout 1 to Sout n are synchronized with rising edges of the sequentially-outputted scan signals Gout 1 to Gout n, and maintain either a high or low potential state for a period of one frame.

The common voltages Sout 1 to Sout n are sequentially and individually supplied to corresponding common voltage lines, and synchronized with the rising edges of the scan signals Gout 1 to Gout n. Accordingly, a high potential pulse and a low potential pulse are alternately supplied to the second electrodes of the first sub-pixels and the second electrodes of the second sub-pixels through the common voltage lines.

Figure 8:
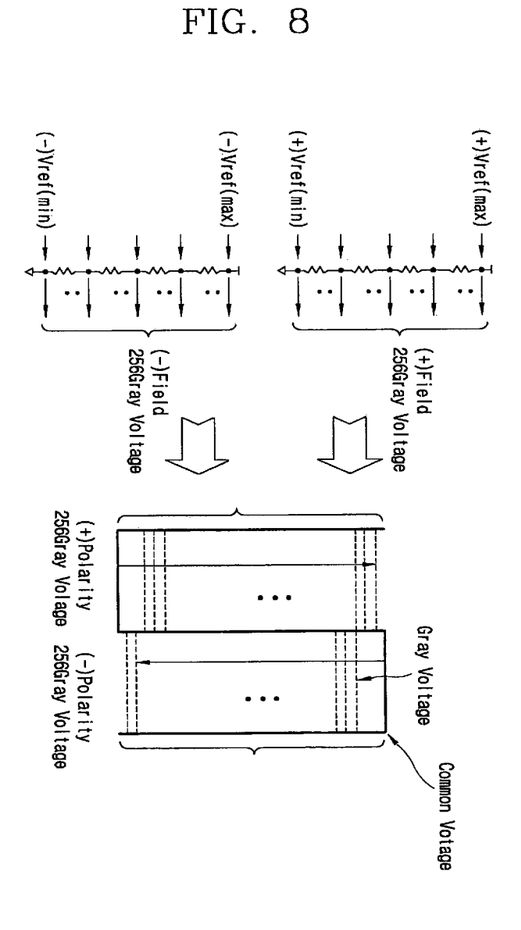
FIG. 8 is a view illustrating an output voltage arrangement of a data driving unit.

FIG. 8 is an exemplary view illustrating output voltage characteristics of the data driving unit. Image information is displayed with various luminance steps by the liquid crystal display device. An image may be displayed with 256 luminance steps, although there is no general limitation to be implied from this example. In order to drive the liquid crystal display device with the dot inversion method, 256-step luminance data of positive (+) polarity and 256-step luminance data of negative (−) polarity are generated with respect to the common voltages. The 256-step luminance may be referred as a gray scale of 256 levels.

As shown in FIG. 8, the output voltages from the data driving unit may divided into positive polarity output voltages (+)Vref and negative polarity output voltages (−)Vref. The positive polarity output voltages (+)Vref and the negative polarity output voltages (−)Vref are respectively provided with 256 gray levels. In an aspect, the positive and negative polarity output voltages respectively may consist of 256 different voltages between a minimum voltage Vref(min) and a maximum voltage Vref(max) in a resistance string consisting of a plurality of resistances connected in series.

Different polarity gray voltages are individually selected from the positive polarity 256 gray level voltages and the negative polarity 256 gray level voltages, and respectively outputted through the first group of data lines and the second group of data lines. That is, one of the positive polarity 256 gray level voltages of the data driving unit is outputted through the first group of data lines or the second group of data lines, thereby driving the liquid crystals by the voltage difference with respect to the low potential common voltage from the gate driving unit, and one of the negative polarity 256 gray level voltages of the data driving unit is outputted through the first group of data lines or the second group of data lines, thereby driving the liquid crystals by the voltage difference with respect to the high potential common voltage from the gate driving unit.

The first group of data lines and the second group of data lines are supplied inverted polarity image information. The voltages supplied to the first group of data lines have an inverted pulse form with respect to voltage supplied to the second group of data lines. However, the gray level voltages are associated with each data line, the inverted and non-inverted image information may be represented by different gray level voltages.

Figure 9:
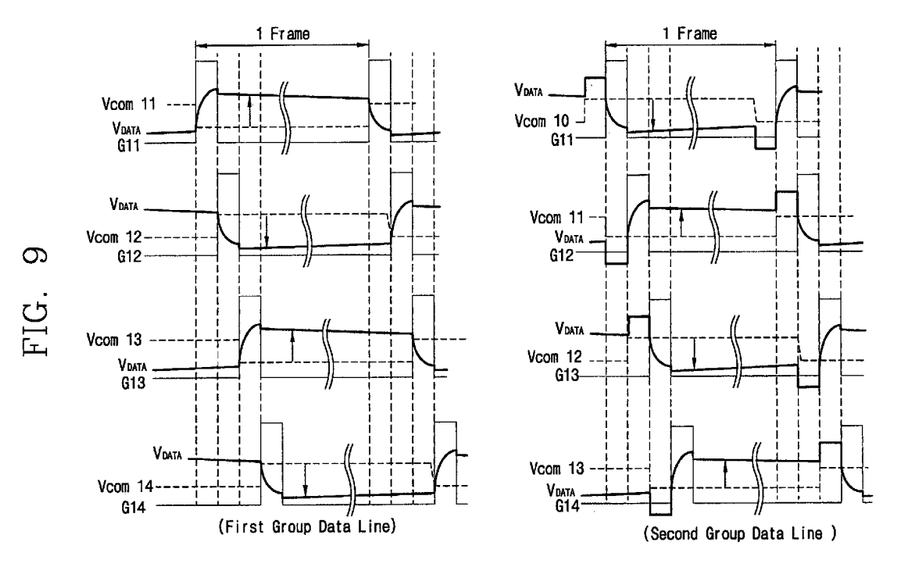
FIG. 9 is a waveform view illustrating waveforms of pixel voltages of first and second groups of data lines in the liquid crystal display device

FIG. 9 is a waveform view illustrating waveforms of the pixel voltages of the first and second groups of data lines in the liquid crystal display device. In order to drive the liquid crystals by increasing the voltage differences between the common voltages from the gate driving unit and the positive and negative polarity information from the data driving unit, the common voltages have voltages separated into high and low potentials. In addition, the common voltage lines are individually separated and the common voltages different from each other are respectively supplied to the common voltage lines.

For the same gray level, the polarities of the image information $V_{DATA}$ supplied to the first and second groups of data lines differ from each other. That is, the image information $V_{DATA}$ is inverted in adjacent data lines according to the dot inversion method.

A further description of the driving method is now presented. After the $10^{th}$ common voltage Vcom10 has previously been supplied, when the $11^{th}$ scan signal G11 and the $11^{th}$ common voltage Vcom11 are supplied at the same time in the next frame, the liquid crystals are driven by the voltage difference between the $11^{th}$ common voltage Vcom11 and the positive polarity image information for the first group of data lines, and also driven by the voltage difference between the $10^{th}$ common voltage Vcom10 and the negative polarity image information for the second group of data lines. At this time, a voltage magnitude of image information is changed due to the $10^{th}$ common voltage Vcom which has been previously transited to a high potential before the $11^{th}$ scan signal G11 was supplied. The pixel electrode which is supplied with image information operates as a storage capacitor with the common electrode which is supplied with common voltage. Accordingly, the voltage of image information is changed due to a coupling with the common voltage. The $10^{th}$ common voltage Vcom10 and the $11^{th}$ common voltage Vcom11 are voltages of pulse form which are inverted from each other.

When the $12^{th}$ scan signal G12 is supplied, the liquid crystals are driven by the voltage difference between the image information supplied by the first group of data lines and the $11^{th}$ common voltage Vcom11 outputted and maintained during the previous horizontal period, and the liquid crystals are driven by the voltage difference between the image information of the second group of data lines and the $12^{th}$ common voltage Vcom12 outputted simultaneously with the second scan signal G12.

That is, when each scan signal G11 to G14 is supplied, the liquid crystals are driven by the voltage differences between the image voltage information of the first and second groups of data lines and the common voltage outputted in the previous horizontal period and the common voltage outputted simultaneously with the scan signal G11 to G14 in the current horizontal period.

The driving method of the liquid crystal display device may increase the voltage differences between the common voltages and the image information for driving the liquid crystals. Even when the voltage supplied to the liquid crystals is set lower than that of the conventional device, the pixels can be driven by the same magnitude of voltage as that of the conventional device. It may result in lower power consumption of the liquid crystal display device.

The data driving unit may drive the liquid crystal display device according to the dot inversion method for supplying different polarity gray level voltages of image information to the first and second groups of data lines. The dot inversion method may prevent the reduction of quality of image, such as crosstalk or flicker.

Figure 10:
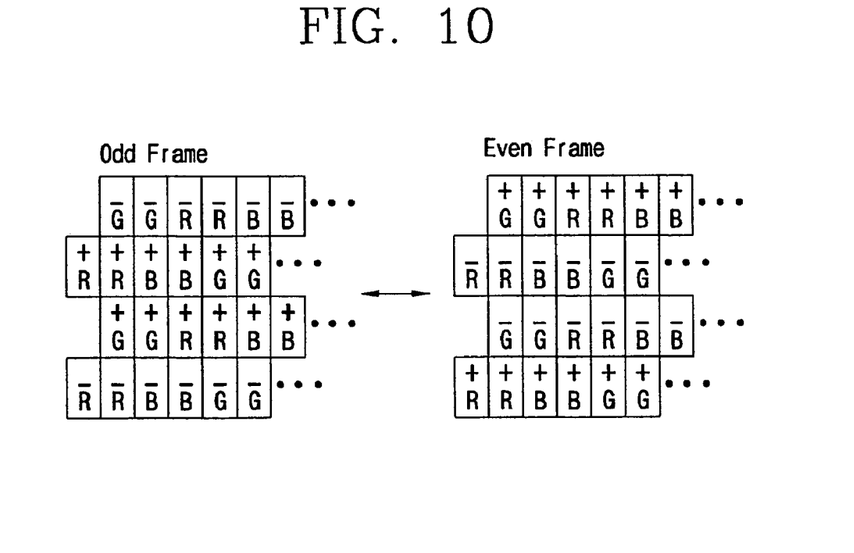
FIG. 10 is a view illustrating a voltage polarity arrangement of pixels for common voltages.

FIG. 10 is a view illustrating voltage polarity constitution of the pixels for the common voltages. The data driving unit supplies different polarity gray level voltages of image information to the first and second groups of data lines, which may thereby reduce errors such as crosstalk or flicker.

The polarity constitution of pixels displayed by which the pixels are arranged on panel according to the dot inversion method is shown as the result of the line inversion method. The same polarities are formed in each row of pixels to increase the voltage differences between the image information and the common voltages supplied to every two row of the pixels. Polarities may be wholly inverted in each frame to prevent deterioration of the liquid crystals.

As the image information is supplied from the data driving unit in accordance with the dot inversion method, crosstalk and flicker can be reduced. In addition, when the polarities of the pixels are displayed as a result of the line inversion method, the voltage differences between the image information and the common voltages can be maximized.

Figure 11:
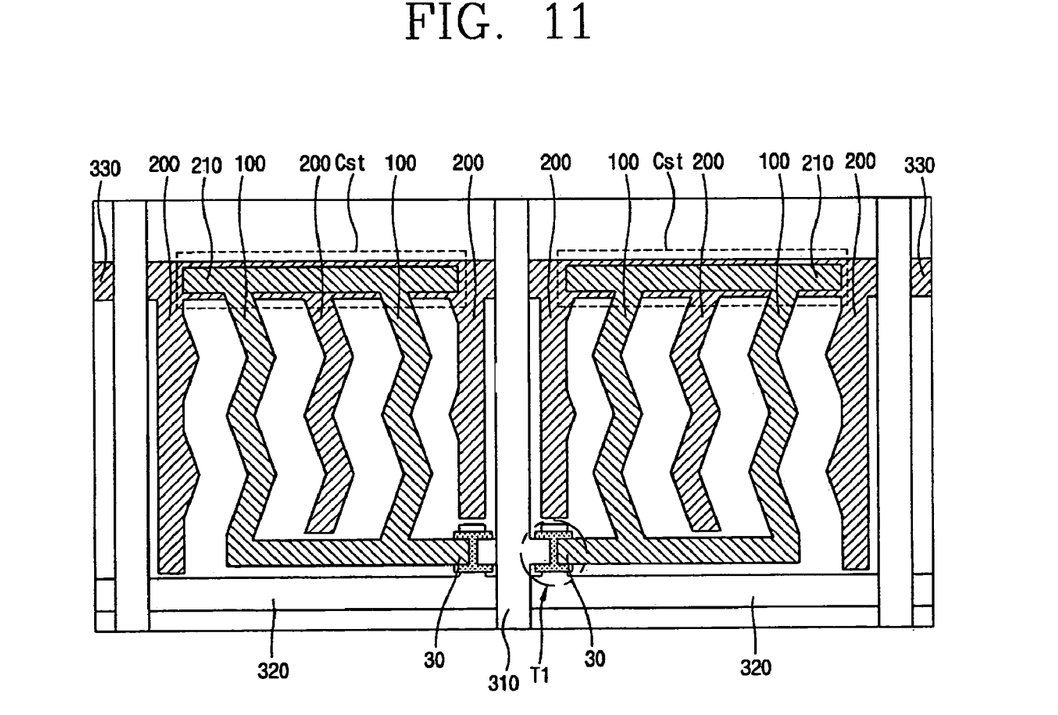
FIG. 11 is a plane view illustrating a pixel of the liquid crystal display device.

Pixels may be designed for increasing the aperture ratio as a plurality of lines are formed traversing the regions of the pixels such as the first group of data lines, the second group of data lines and the common voltage lines. FIG. 11 is a detailed plane view illustrating the pixel of the liquid crystal display device.

The pixel is divided into two sub-pixels by a data line 310. Pixel electrodes 100 and common electrodes 200 for forming a horizontal electric field are electrically connected to a gate line 320 and a common electrode line 330. Thin film transistors T1, electrically connected to the data line 310, are symmetrically disposed with respect to the data line 310. Pixel electrode lines 210 overlap with the common electrodes 200, and storage capacitors Cst are formed in the spaces thereof.

In order to improve charging characteristics of the pixels, the thin film transistors T1, which are used as switching devices, are individually disposed in the first and second sub-pixels. The common electrodes 200 and the pixel electrodes 100 of each sub-pixel are alternately arranged in a zigzag shape. The zigzag arrangement of the two electrodes improves the viewing angle of the liquid crystals arranged between the two electrodes in various directions.

When the common electrodes and the pixel electrodes of each sub-pixel are symmetrically arranged in a zigzag shape, such symmetrical zigzag arrangement supplements the viewing angle between the divided pixels, to improve viewing angle characteristics.

The liquid crystal display device and the driving method thereof may smoothly display the image by adopting the delta arrangement of the pixels, restrict reduction of quality of image due to distortion and delay of the scan signals, common voltages and image information, by forming the data lines and the gate lines in a straight line shape, and improve charging characteristics of the pixels by individually disposing the switching devices in the pixels divided by the first and second groups of data lines.

Furthermore, the gate driving unit supplies the common voltages of the pulse form inverted in every horizontal period to the common voltage lines according to the scan signals, and the data driving unit supplies different polarities of image information to the first and second groups of data lines, thereby increasing the voltage differences between the common voltages and the image information. Even though the voltage applied to the liquid crystals is set lower than that of the conventional device, the pixels can be driven by the same magnitude of voltage as that of the conventional device, which results in low power consumption of the liquid crystal display device.

Although the present invention has been explained by way of the embodiments described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal device, comprising;
   rows of R, G, B, pixels arranged in a horizontal direction on a substrate, disposed such that adjacent pixels are separated by a distance D, odd-numbered and even-numbered rows being displaced with respect to each other in the horizontal direction by a distance D/2;
   a first data line disposed to divide the pixels of the odd-numbered rows into first sub-pixels having one polarity of voltage, and to partition the pixels of the even-numbered rows, and a second data line disposed to divide the pixels of the even-numbered rows into second sub-pixels having a different polarity with the voltage polarity of the first sub-pixels, and to partition the pixels of the odd-numbered rows;
   wherein the first and second data lines are alternately arranged on the substrate in the vertical direction;
   gate line arranged on the substrate between the pixels of the odd-numbered rows and the pixels of the even-numbered rows, for simultaneously supplying scan signal to the R, G, B pixels arranged as a delta configuration in the odd-numbered and the even-numbered rows of pixels; and
   common voltage lines arranged on the substrate alternately with the gate lines as having a different polarity of voltage, and maintaining the same distance with the gate line as respectively comparting one side and the other side of the first and second sub-pixels of R, G, B disposed in a delta configuration.

2. The device according to claim 1, wherein each row of pixels comprises R, G and B pixels arranged sequentially and repetitively.

3. The device according to claim 1, further comprising first electrodes and second electrodes individually disposed in the first sub-pixels and the second sub-pixels, and switching devices disposed in each of the first and second sub-pixels.

4. The device according to claim 3, wherein the first and second electrodes are disposed to form a horizontal electric field.

5. The device of claim 3, wherein the first electrodes are pixel electrodes and the second electrodes are common electrodes.

6. The device of claim 5, wherein the switching devices are symmetrically formed at both sides of the first and second data lines, and connected to the first electrodes of the first sub-pixels and the second sub-pixels.

7. The device of claim 6, wherein the switching devices are thin film transistors having their gate electrodes connected to the gate lines, their source electrodes connected to the first group of data lines or the second group of data lines, and their drain electrodes connected to the first electrodes of the first sub-pixels or the second sub-pixels.

8. The device of claim 3, wherein the first electrodes and the second electrodes in at least one of the first sub-pixels and the second sub-pixels are arranged in a zigzag shape.

9. The device of claim 8, wherein the first electrodes and the second electrodes of each sub-pixel are symmetrically arranged.

10. The device according to claim 1, wherein pulse-form scan signals are supplied, sequentially time shifted in successive gate lines, and pulse-form common voltages are synchronized with the rising edge of scan signals and maintain a high or low potential for a time duration of a frame.

11. The device of claim 1, wherein the gate lines and the common voltage lines are arranged in a straight line shape.

12. The device of claim 1, wherein the gate lines and the common voltage lines are arranged in a zigzag shape.

13. A liquid crystal device, comprising;
   odd-numbered rows of R, G and B pixels arranged sequentially and repeatedly on a substrate in the horizontal direction as having one polarity of voltage;
   even-numbered rows of R, G and B pixels arranged sequentially and repeatedly on a substrate to be shifted from the odd-numbered rows of pixels as having a different polarity with the voltage polarity of the first sub-pixels;
   dots formed by delta-arranging three R, G and B pixels of the odd-numbered rows and the even-numbered rows;
   a first group of data lines for diving the odd-numbered rows of pixels into first sub-pixels and partitioning the even-numbered rows of pixels, and a second group of data lines for dividing the even-numbered rows of pixels into second sub-pixels and partitioning the odd-numbered rows of pixels,
   wherein the first and second groups of data lines are alternately arranged on the substrate in the vertical direction;
   first electrodes and second electrodes individually disposed in a zig-zag shape in the first sub-pixels and the second sub-pixels, for forming a horizontal electric field;
   switching devices individually disposed in the first sub-pixels and the second sub-pixels;
   gate lines arranged on the substrate between the pixels of the odd-numbered rows and the pixels of the even-numbered row, for simultaneously supplying scan signal to the R, G, B pixels arranged as a delta configuration in the odd-numbered rows and the even-numbered rows of pixels and supplying scan signals of pulse form sequentially shifted in every two row of the first sub-pixels and the second sub-pixels; and
   common voltage lines arranged on the substrate alternately with the gate lines as having a different polarity of voltage, and maintaining the same distance with the gate line as respectively comparting one side and the other side of the first and second sub-pixels of R, G, B disposed in a delta configuration, for supplying common voltages of pulse form synchronized with rising edges of the scan signals for maintaining a high or low potential for one frame to the second electrodes disposed in the first sub-pixels and the second sub-pixels.

14. A liquid crystal display device, comprising;
horizontal rows of pixels, alternate rows being disposed horizontally displaced from each other;
first data lines disposed vertically such that pixels in odd-numbered rows are divided into first sub-pixels having one polarity of voltage, and second data lines disposed vertically such that pixels in even-numbered rows are divided into second sub-pixels having a different polarity with the voltage polarity of the first sub-pixels,
wherein the first and second data lines are alternately arranged on the substrate in the vertical direction;
gate lines arranged on the substrate between the pixels of the odd-numbered rows and the pixels of the even-numbered rows, for simultaneously supplying scan signal to the R, G, B pixels arranged as a delta configuration in the odd-numbered rows and the even-numbered rows of pixels;
common voltage lines arranged on the substrate alternately with the gate lines as having a different polarity of voltage, and maintaining the same distance with the gate line as respectively comparting one side and the other side of the first and second sub-pixels of R, G, B disposed in a delta configuration;
first electrodes and second electrodes individually disposed in the first sub-pixels and the second sub-pixels in a zig-zag shape; and
switching devices individually disposed in the first sub-pixels and the second sub-pixels.

15. A liquid crystal display, comprising;
horizontal rows of pixels, alternate rows being disposed horizontally displaced from each other, pixels in each row being divided into first and second groups of sub-pixels by alternate vertically disposed data lines;
means for supplying the first group of sub-pixels with data signals for having one polarity of voltage;
means for supplying the second group of sub-pixels with data signals for having a different polarity with the voltage polarity of the first sub-pixels;
means for simultaneously supplying scan signals to gate lines disposed in a delta configuration in the first group and the second group rows of sub-pixels; and
means for supplying common voltage to common voltage lines arranged on the substrate alternately with the gate lines as having a different polarity of voltage, and maintaining the same distance with the gate line as respectively comparting one side and the other side of the first and second sub-pixels of R, G, B disposed in a delta configuration,
wherein the common voltages are of pulse form and synchronized with rising edges of the scan signals for maintaining a high or low potential for one frame.

16. A driving method of a liquid crystal display device in which odd-numbered rows of pixels and even-numbered rows of pixels are arranged to be shifted horizontally with respect to each other on a substrate and dots are formed by delta-arranging three R, G and B pixels of the odd-numbered rows and the even-numbered rows, the method comprising;
turning-on switching devices disposed in the odd-numbered rows of pixels and the even-numbered rows of pixels by supplying scan signals of pulse form sequentially to gate lines arranged on the substrate in every two row of pixels;
supplying common voltages to common electrodes formed in a zig-zag shape and connected to the common voltage lines arranged on the substrate alternately with the gate lines as maintaining the same distance with the gate line as respectively comparting one side and the other side of the first and second sub-pixels of R, G, B disposed in a delta configuration by supplying a different level of voltage to the common voltage lines;
wherein common voltages have pulse form synchronized with rising edges of the scan signals for maintaining a high or low potential for one frame to pixel electrodes disposed in a zig-zag shape in the odd-numbered rows of pixels and the even-numbered rows of pixels; and
driving the first sub-pixels having one polarity of voltage and the second sub-pixels for having a different polarity with the voltage polarity of the first sub-pixels of R, G, B disposed in a delta configuration by supplying image information to the pixel electrodes disposed in a zig-zag shape in the odd-numbered rows of pixels and the even-numbered rows of pixels from a first group of data lines and a second group of data lines alternately arranged on the substrate in the vertical direction through the turned-on switching devices.

17. The method of claim 16, wherein the image information is supplied to the odd-numbered rows and the even-numbered rows of pixels according to a dot inversion method.

18. The method of claim 16, wherein the odd-numbered rows and the even-numbered rows of pixels are driven according to a line inversion method.

* * * * *